(12) United States Patent
Davis et al.

(10) Patent No.: US 12,051,116 B2
(45) Date of Patent: *Jul. 30, 2024

(54) METHOD AND SYSTEM FOR INTEGRATING ONLINE SALES OF CONSUMER PRODUCTS WITH THE SALE OF CORRESPONDING INSURANCE

(71) Applicant: STATE FARM MUTUAL AUTOMOBILE INSURANCE COMPANY, Bloomington, IL (US)

(72) Inventors: Timothy Joel Davis, Warrenville, IL (US); Amy Engelhorn, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 63 days.

This patent is subject to a terminal disclaimer.

(21) Appl. No.: 18/080,971

(22) Filed: Dec. 14, 2022

(65) Prior Publication Data

US 2023/0116226 A1 Apr. 13, 2023

Related U.S. Application Data

(63) Continuation of application No. 16/672,065, filed on Nov. 1, 2019, now Pat. No. 11,556,996, which is a (Continued)

(51) Int. Cl.
*G06Q 40/08* (2012.01)
(52) U.S. Cl.
CPC .................... *G06Q 40/08* (2013.01)

(58) Field of Classification Search
None
See application file for complete search history.

(56) References Cited

U.S. PATENT DOCUMENTS 8,407,102 B2 3/2013 Field et al.
9,141,996 B2 9/2015 Christensen et al.
(Continued)

OTHER PUBLICATIONS

Office Action for U.S. Appl. No. 14/828,693 dated Oct. 2, 2018.
(Continued)

*Primary Examiner* — Joseph W. King
(74) *Attorney, Agent, or Firm* — MARSHALL, GERSTEIN & BORUN LLP

(57) ABSTRACT

Methods, systems, apparatus, and non-transitory computer readable media are described for integrating the online purchase of a product with the purchase of an insurance policy providing coverage for the product. When a customer initiates the purchase of a product through an online retailer, various aspects include obtaining personal information for the customer, as well as product information for the product. Based upon this information, various aspects may include determining whether the customer is eligible to purchase insurance, and assessing a level of risk in providing a particular type of insurance coverage to the customer. Additionally, various aspects may further include determining an insurance quote based upon this level of risk and transmitting an offer to purchase the insurance policy to the customer. The customer may then purchase the product and insurance policy in one transaction such that binding insurance coverage for the product is provided at the time of purchase.

16 Claims, 10 Drawing Sheets

Related U.S. Application Data continuation of application No. 14/828,693, filed on Aug. 18, 2015, now Pat. No. 10,515,415.

(60) Provisional application No. 62/081,865, filed on Nov. 19, 2014.

(56) References Cited

U.S. PATENT DOCUMENTS

| | | |
|---|---|---|
| 10,515,415 B1 | 12/2019 | Davis et al. |
| 2009/0164256 A1 | 6/2009 | Fisher et al. |
| 2009/0164258 A1 | 6/2009 | Broodryk |
| 2014/0257873 A1 | 9/2014 | Hayward et al. |
| 2015/0186869 A1 | 7/2015 | Winters et al. |

OTHER PUBLICATIONS

Office Action for U.S. Appl. No. 14/828,693, dated Jan. 12, 2018.
Office Action for U.S. Appl. No. 14/828,693, dated Jul. 12, 2018.
Office Action for U.S. Appl. No. 14/828,693, dated May 1, 2019.
U.S. Appl. No. 14/511,360, filed Oct. 10, 2014.
U.S. Appl. No. 14/539,296, filed Nov. 12, 2014.
U.S. Appl. No. 16/672,065, Final Office Action, dated May 12, 2022.
U.S. Appl. No. 16/672,065, Nonfinal Office Action, dated Aug. 6, 2021.
U.S. Appl. No. 16/672,065, Nonfinal Office Action, dated Feb. 19, 2021.
U.S. Appl. No. 16/672,065, Notice of Allowance, dated Apr. 5, 2021.
U.S. Appl. No. 16/672,065, Notice of Allowance, dated Oct. 28, 2022.

340

⌁ CARRIER 3G    4:20PM ▭

342 — Collision Insurance
352 — [Accept ▼]    $20 — 350
344 — Comprehensive Insurance
     [Decline ▼]    $0
346 — Liability Insurance
     [Accept ▼]    $40
                Total    $60 — 354

[ Add to Cart ] — 348

⌁ CARRIER 3G    4:20PM ▭

362 —
370 — Date: December 20, 2014
                   Amount:
364 — [Auto F26 ▼]   [$2000] — 366
374 — [Auto Insurance]   [$60] — 376
     Payment        [Red Card
     Method:        xxxxxxxx] — 368
     Total:         [$2060] — 378

[ Submit Payment ] — 372

| | |
|---|---|
| ▁▃▅ CARRIER 3G | 4:20PM ▭ |

382 — Name ☐
384 — Address ☐
386 — D/O/B ☐
388 — Marital Status ☐
390 — Gender ☐
392 — Vehicle Year, Make, and Model ☐
394 — Anti Theft Devices ☐
396 — # of Accidents ☐

Submit — 398

*FIG. 3E*

METHOD AND SYSTEM FOR INTEGRATING ONLINE SALES OF CONSUMER PRODUCTS WITH THE SALE OF CORRESPONDING INSURANCE

CROSS-REFERENCE TO RELATED APPLICATIONS

This application is a continuation of U.S. patent application Ser. No. 16/672,065 entitled "Method And System For Integrating Online Sales Of Consumer Products With The Sale Of Corresponding Insurance," filed on Nov. 1, 2019, which is a continuation of U.S. patent application Ser. No. 14/828,693 entitled "Method And System For Integrating Online Sales Of Consumer Products With The Sale Of Corresponding Insurance," filed on Aug. 18, 2015, which claims priority to and the benefit of the filing date of provisional U.S. Patent Application No. 62/081,865 entitled "Method And System For Integrating Online Sales Of Consumer Products With The Sale Of Corresponding Insurance," filed on Nov. 19, 2014, the entire contents of which is hereby expressly incorporated herein by reference.

TECHNICAL FIELD

The present disclosure generally relates to systems, methods, apparatus, and non-transitory computer readable media for handling and/or processing online insurance purchases and, more particularly to integrating the online sale of an insurance policy with the purchase of an insurable product.

BACKGROUND

Today, customers purchase a variety of products through online retailers. For example, a customer may purchase vehicles, homes, jewelry, electronics, machinery, etc., online. Insurance for these products may also be purchased online, but customers purchase insurance policies separately from the product for which they provide coverage. For example, a customer may purchase a car online through a dealership website. However, the customer must purchase insurance coverage for the car through an additional service, resulting in a time consuming and inconvenient process, particularly in situations where purchasing insurance for the product is mandatory (e.g., auto insurance in some states).

BRIEF SUMMARY

The present embodiments may relate to integrating the online sale of an insurance policy with the online sale of an insurable product. When a customer purchases an insurable product online, an insurance provider may receive information about the customer via a communication network. The insurance provider may analyze this information to determine whether the customer may be eligible to purchase an insurance policy providing coverage for the insurable product. If the insurance provider determines that the customer is eligible, an offer to purchase the insurance policy may be transmitted to the customer via the communication network. Moreover, the insurance provider may receive and analyze additional customer information to determine an appropriate insurance premium for the policy. The insurance premium amount may also be transmitted to the customer via the communication network, and the customer may purchase the insurance policy along with the insurable product through one service.

In one aspect, a computer-implemented method of integrating an online insurance purchase with an online purchase of an insurable product may be provided. The method may include: (1) obtaining (via one or more processors, and/or wired or wireless communication and/or data transmission) an indication of an online selection of an insurable product by a customer, wherein the insurable product may be selected via an online retailer; (2) receiving (via the one or more processors, and/or wired or wireless communication and/or data transmission) from the online retailer, user history information corresponding to the customer; and/or (3) determining (via the one or more processors) whether the customer is eligible for an online insurance purchase which may provide coverage for the insurable product according to a set of eligibility rules, based upon the user history information corresponding to the customer. When the customer is eligible for the online insurance purchase, the method may include: (4) receiving (via the one or more processors, and/or wired or wireless communication and/or data transmission) customer insurance risk information for the customer; (5) determining (via the one or more processors) a level of risk for insuring the customer based upon the customer insurance risk information; (6) determining (via the one or more processors) an insurance quote based upon the level of risk for insuring the customer; and/or (7) transmitting (via the one or more processors, and/or wired or wireless communication and/or data transmission) an indication of a temporary or binding offer (such as an actionable offer or quote for insurance) to provide insurance for the insurable product which is to be displayed in a first order review page (and/or on a display or display screen), wherein the first order review page may include an indication of the insurable product. Upon receiving a request from the customer to purchase insurance, the method may include: (8) transmitting (via the one or more processors, and/or wired or wireless communication and/or data transmission) the insurance quote to be displayed in a second order review page (and/or on the display or display screen) to facilitate providing immediately binding insurance coverage for the insurable product at the time of purchase. The method may include additional, fewer, or alternative actions, including those discussed elsewhere herein.

In another aspect, a system for integrating an online insurance purchase with an online purchase of an insurable product may be provided. The system may include a communication network, one or more processors communicatively coupled to the communication network and/or a non-transitory computer-readable memory coupled to the one or more processors and storing thereon instructions. When executed by the one or more processors, the instructions may cause the system to: (1) receive, from an online retailer and via the communication network, an indication of an online selection of an insurable product by a customer, wherein the insurable product may be selected via the online retailer; and/or (2) receive, from the online retailer, user history information corresponding to the customer. The instructions may further cause the system to: (3) determine whether the customer may be eligible for an online insurance purchase which provides coverage for the insurable product according to a set of eligibility rules, based upon the user history information corresponding to the customer; and/or when the customer is eligible for the online insurance purchase, the instructions may cause the system to: (4) receive customer insurance risk information for the customer; (5) determine a level of risk for insuring the customer based upon the customer insurance risk information; (6) determine an insurance quote based upon the level of risk for insuring the customer; and/or (7) transmit, via the communication network, an indication of an offer (such as a binding or actionable offer) to provide insurance for the insurable product to be displayed in a first order review page on a web-enabled device of the customer, wherein the first order review page may include an indication of the insurable product. Upon receiving a request from the customer to purchase the insurance, the instructions may cause the system to: (8) transmit, via the communication network, the insurance quote to be displayed in a second order review page on the web-enabled device to facilitate providing immediately binding insurance coverage for the insurable product at the time of purchase. The system may include additional, fewer, or alternate components and/or functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

FIG. 3C depicts an exemplary insurance coverage selection screen of a client application in accordance with an exemplary aspect of the present disclosure;

FIG. 3D depicts an exemplary additional order review screen of a client application in accordance with an exemplary aspect of the present disclosure;

FIG. 3E depicts an exemplary insurance application screen of a client application in accordance with an exemplary aspect of the present disclosure;

Figure 1:
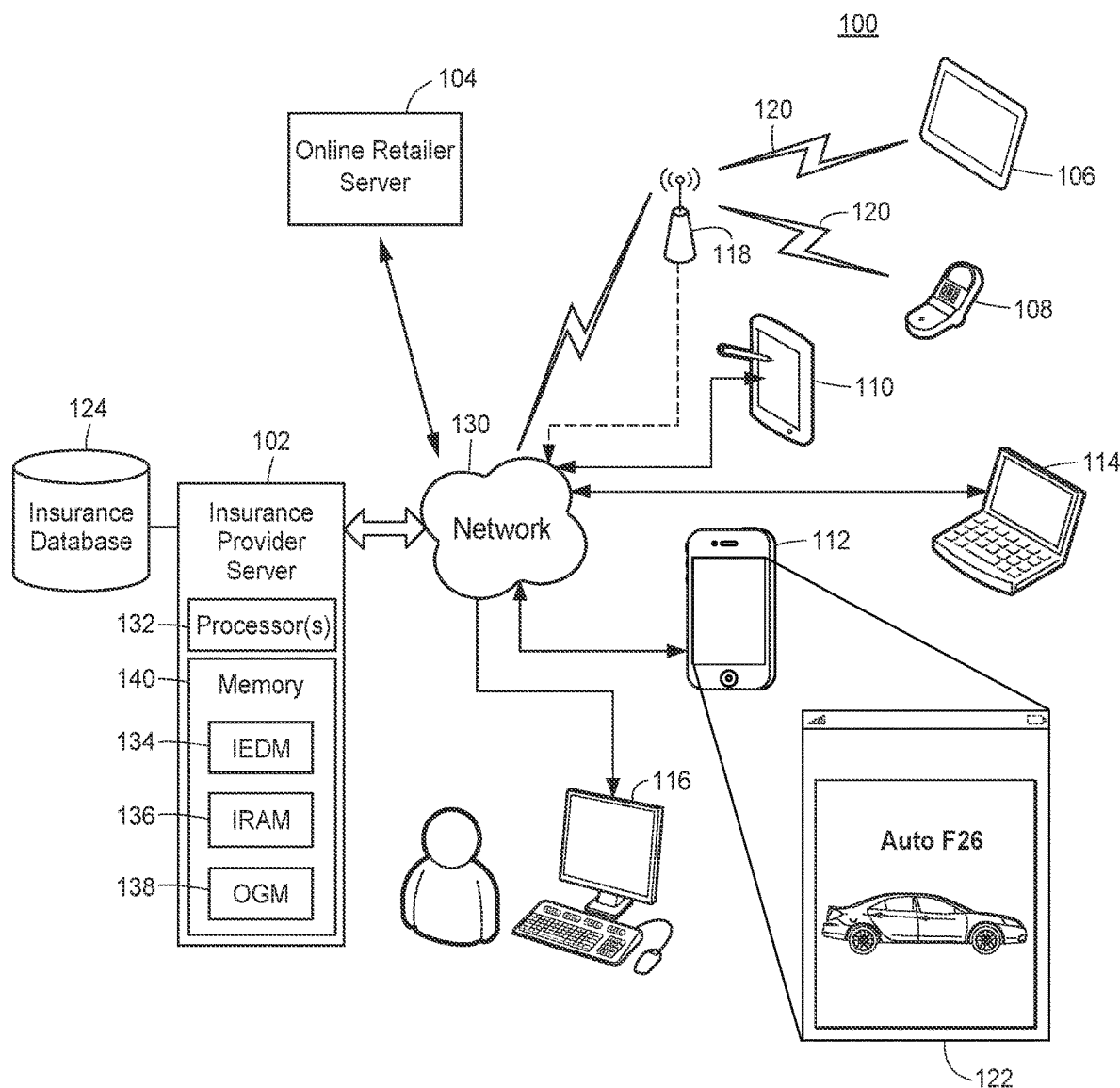
FIG. 1 illustrates a block diagram of a computer network and system on which an exemplary insurance integration system may operate in accordance with an exemplary aspect of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

To integrate the online sale of an insurance policy with the online sale of an insurable product, an insurance integration system may become notified when a customer has initiated the purchase of an insurable product through an online retailer. The online retailer may then transmit user history information to the system such as the customer's name, verified mailing address, a number of transactions completed through the online retailer, an approval rating, a credit rating, financial or employment information, etc.

Based upon this information, the system may determine whether the customer is or may be eligible to receive an offer to purchase an online insurance policy providing coverage for the insurable product. In one embodiment, the offer may be an offer for temporary or permanent insurance coverage, and/or may be an actionable offer that the insured or insurance customer may act on or otherwise accept. Other types of offers are also envisioned.

If the customer is eligible, the system may provide the offer to the customer as the customer completes the online purchase of the insurable product. When the customer accepts the offer, the system may generate an insurance quote based upon a determined level of risk for the customer, and/or may provide the insurance quote in an order review screen which may include the insurable product and/or its corresponding price. In this manner, the customer may purchase both the product and the insurance policy through a single service, and in some cases, through a single payment. Therefore, the insurance integration system may provide a simple and efficient process for a customer who wants to insure her recently purchased product.

An insurance provider may offer and/or provide one or more different types of insurance policies. Types of insurance policies may include, for example, homeowner's insurance; condominium owner's insurance; renter's insurance; auto insurance; boat insurance; motorcycle insurance; snowmobile insurance; personal articles insurance; and other types of insurance products. In embodiments as described herein, the insurance providers initiate and/or process claims related to insurance policies that cover one or more property items (e.g., homes, condominiums, apartments, automobiles, jewelry, electronics, televisions, etc.).

When a customer initiates the purchase of (and/or the process of purchasing) an insurable product from an online (or other) retailer, an insurance provider server may receive an indication of the insurable product; the product's ownership and maintenance history; the product's estimated worth, sale price, or condition; and/or other information. The insurance provider server may also receive user history information for the customer from the online retailer or other sources, including the customer information indicated elsewhere herein.

The insurance provider server may then analyze the information received. For instance, the insurance provider may compare the user history information (and/or other customer information, such as financial, employment, or credit rating information) for the customer to a set of stored eligibility rules to determine whether the customer is eligible to purchase insurance for the insurable product. If the customer is eligible, the insurance provider server may then transmit an offer to purchase insurance to the online retailer, which in turn may transmit the offer to the customer via an online retailer web page.

If the customer accepts the offer, for example, by clicking on an option to accept on the online retailer web page, the insurance provider may receive more detailed information for the customer, from the online retailer, and/or from a third party. The insurance provider server may then determine an insurance quote for one or more insurance policies corresponding to the insurable product, and/or transmit the insurance quote to the customer via the online retailer web page. Additionally or alternatively, the insurance quote may be transmitted to the customer with the offer in the first instance. The offer and/or quote for insurance may be actionable by the customer. For example, by the customer clicking acceptance of the offer and/or quote, the insurance coverage may become binding and/or otherwise in force upon the customer purchasing the product.

In one embodiment, the customer may purchase both the insurable product and the corresponding insurance policy in a single payment through the online retailer web page, and/or the retailer may transmit the portion paid for the insurance to the insurance provider. Other payment methods may be used.

Generally speaking, the techniques for integrating the online sale of an insurance policy with the online sale of an insurable product may be implemented in an insurance provider server, an online retailer server, a client device, and/or a system that includes several of these devices. However, for clarity, the examples below focus primarily on embodiments in which the online retailer server generates and/or transmits web pages and/or application screens to the client device for purchasing an online product. The insurance provider server may transmit online insurance offers and/or insurance quotes to the online retailer server, which in turn, may transmit web pages and/or application screens, including the insurance offers and/or insurance quotes to the client device. In other embodiments, the insurance provider server may generate and transmit web pages and/or application screens to the client device, which may include the insurance offers and/or insurance quotes.

I. Exemplary Environment for Insurance Integration

FIG. 1 illustrates various aspects of an exemplary environment implementing an insurance integration system 100. The environment 100 may include an insurance provider server 102, an online retailer server 104, and/or a plurality of client devices 106-116 which may be communicatively connected through a network 130, as described below. According to some embodiments, both the insurance provider server 102 and the online retailer server 104 may be a combination of hardware and software components, as described in more detail below. The insurance provider server 102 may have an associated database 124 for storing data related to the operation of the insurance integration system 100 (e.g., customer records for past or current customers who purchased an insurance policy from the insurance provider, a set of eligibility rules for determining whether a customer is eligible to receive an offer for insurance, one or more types of online insurance policies, etc.). Moreover, the insurance provider server 102 may include one or more processor(s) 132, such as a microprocessor coupled to a memory 140.

The memory 140 may be tangible, non-transitory memory and/or may include any types of suitable memory modules, including random access memory (RAM), read-only memory (ROM), flash memory, other types of persistent memory, etc. The memory 140 may store, for example instructions executable on the processors 132 for an insurance eligibility determination module (IEDM) 134, an insurance risk assessment module (IRAM) 136 and/or an offer generation module (OGM) 138. The insurance provider server 102 is described in more detail below with reference to FIG. 2A.

A. Exemplary Insurance Elibility Determination Module

To determine whether a customer is eligible to purchase an online insurance policy, the insurance eligibility determination module 134 may receive user history information for the customer from the online retailer server 104. The insurance eligibility determination module 134 also may generate a set of eligibility rules and/or retrieve the set of eligibility rules from the insurance database 124. Moreover, the insurance eligibility determination module 134 may compare the user history information to the set of eligibility rules. If the customer is eligible, an offer to purchase insurance may be generated and/or transmitted by the insurance eligibility determination module 134 to the online retailer server 104 (the offer to purchase may also be transmitted along with an initial or final quote, and/or the quotes mentioned below, in some embodiments).

B. Exemplary Insurance Risk Assessment Module

If the offer is accepted by the customer, the insurance risk assessment module 136 may receive personal and/or product information from the online retailer server 104 as well as third parties such as the Department of Motor Vehicles (DMV), a loss history reporting agency, a credit reporting agency, etc. The insurance risk assessment module 136 may then assess a level of risk for insuring the customer's product based upon the personal information and/or the product information, and the level of risk may be provided to the offer generation module 138.

C. Exemplary Offer Generation Module

The offer generation module 138 may then generate insurance quotes for various types of insurance coverage within an insurance policy. For example, if the customer is eligible to purchase an auto insurance policy, the offer generation module 138 may generate separate insurance quotes for liability coverage, collision coverage, comprehensive coverage, uninsured motor vehicle coverage, medical payments coverage, replacement cost coverage, actual value coverage, estimated value coverage, etc., and/or may generate an insurance quote which may include some combination of the various types of insurance coverage. The insurance quotes may be generated based upon the level of risk for insuring the customer's product as determined by the insurance risk assessment module 136. The generated insurance quotes may then be transmitted to the online retailer server 104, which in turn, may transmit the generated insurance quotes to the customer.

D. Exemplary Client Devices

The client devices 106-116 may include, by way of example, a tablet computer 106, a cell phone 108, a personal digital assistant (PDA) 110, a mobile device smart-phone 112 also referred to herein as a "mobile device," a laptop computer 114, a desktop computer 116, a portable media player (not shown), a wearable computing device (not shown), smart glasses, smart watches, phablets, other smart devices, devices configured for wired or wireless RF (Radio Frequency) communication, etc. Of course, any client device appropriately configured may interact with the insurance integration system 100. The client devices 106-116 need not necessarily communicate with the network 130 via a wired connection. In some instances, the client devices 106-116 may communicate with the network 130 via wireless signals 120 and, in some instances, may communicate with the network 130 via an intervening wireless and/or wired device 118, which may be a wireless router, a wireless repeater, a base transceiver station of a mobile telephony provider, etc.

Each of the client devices 106-116 may interact with the insurance provider server 102 and/or the online retailer server 104 to receive web pages and/or server data from the insurance provider server 102 and/or the online retailer server 104 and may display the web pages and/or server data via a client application and/or an Internet browser (described below). For example, the mobile device 112 may display a product display screen 122 of the client application and/or of a retailer web page to a user, may receive an input from the user, and may interact with the insurance provider server 102 and/or the online retailer server 104 depending on the type of user-specified input. It will be appreciated that although only one insurance provider server 102 is depicted in FIG. 1, multiple insurance provider servers 102 may be provided for the purpose of distributing server load, serving different web pages, etc. These multiple insurance provider servers 102 may include a web server, an entity-specific server (e.g. an Apple® server, etc.), a server that is disposed in a retail and/or proprietary network, etc.

Moreover, it will also be appreciated that although only one online retailer server 104 is depicted in FIG. 1, multiple online retailer servers 104 may be provided for the purpose of distributing server load. These multiple online retailer servers 104 may include a server that is disposed in a retail and/or proprietary network, an independent third-party server that is not under the control of the entity, etc.

The insurance provider server 102 may communicate with the online retailer server 104 via the network 130. The digital network 130 may be a proprietary network, a secure public Internet, a virtual private network and/or some other type of network, such as dedicated access lines, plain ordinary telephone lines, satellite links, combinations of these, etc. Where the digital network 130 comprises the Internet, data communication may take place over the digital network 130 via an Internet communication protocol.

II. Exemplary System Hardware

A. Exemplary Insurance Provider Server

Figure 2A:
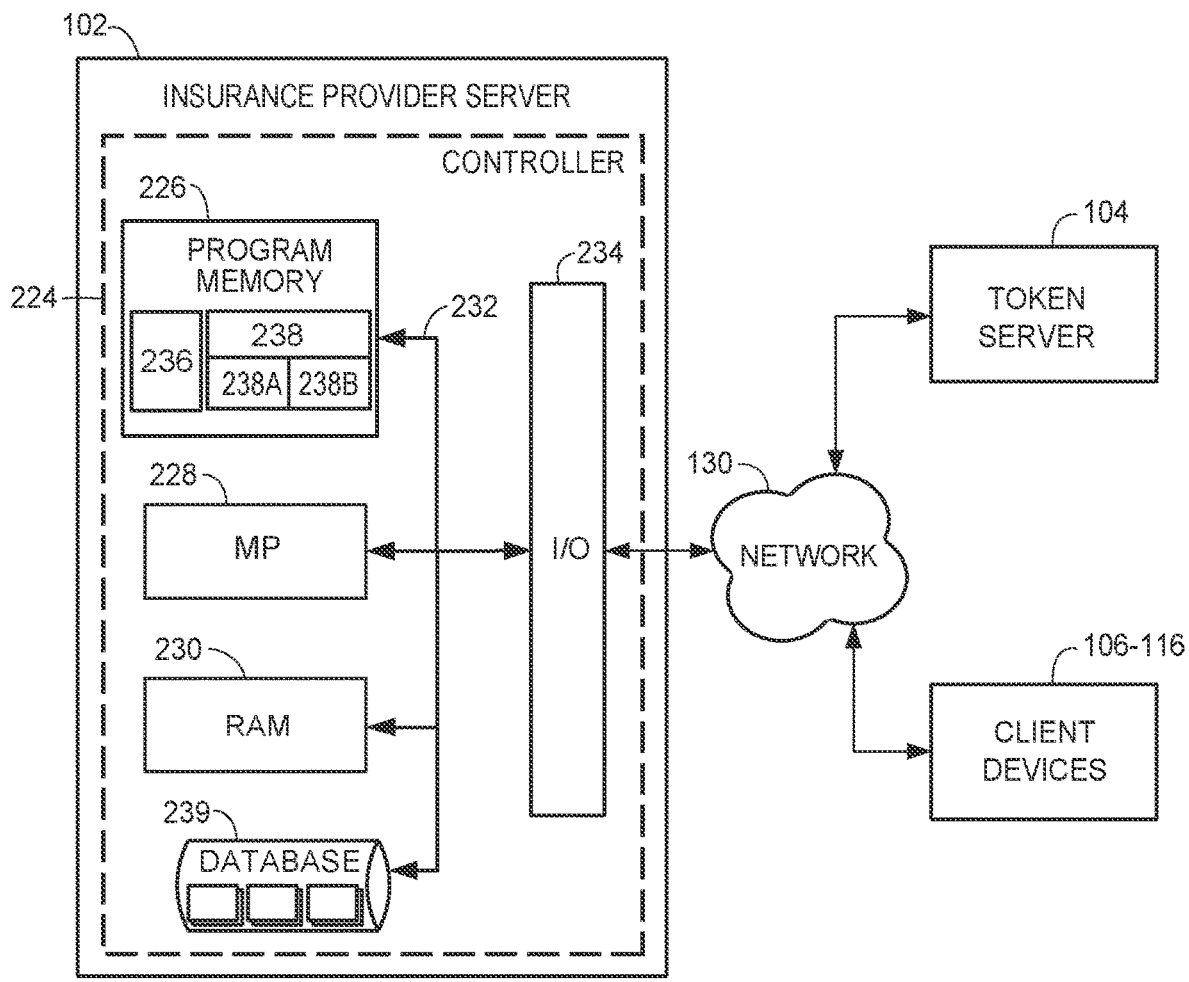
FIG. 2A illustrates a block diagram of an exemplary insurance provider server in accordance with an exemplary aspect of the present disclosure.

Turning now to FIG. 2A, the insurance provider server 102, may include a controller 224. The controller 224 may include a program memory 226, a microcontroller or a microprocessor (MP) 228, a random-access memory (RAM) 230, and/or an input/output (I/O) circuit 234, all of which are interconnected via an address/data bus 232. The program memory 226 and the microprocessor 228 may be similar to the memory 140 and processor 132 respectively, as described in FIG. 1. In some embodiments, the controller 224 may also include, or otherwise be communicatively connected to, a database 239 or other data storage mechanism (e.g., one or more hard disk drives, optical storage drives, solid state storage devices, etc.). The database 239 may include data such as customer web profiles, product data, mobile device application data, web page templates and/or web pages, and other data necessary to interact with the user through the network 130. It should be appreciated that although FIG. 2A depicts only one microprocessor 228, the controller 224 may include multiple microprocessors 228. Similarly, the memory of the controller 224 may include multiple RAMs 230 and/or multiple program memories 226. Although FIG. 2A depicts the I/O circuit 234 as a single block, the I/O circuit 234 may include a number of different types of I/O circuits. The controller 224 may implement the RAM(s) 230 and/or the program memories 226 as semiconductor memories, magnetically readable memories, and/or optically readable memories, for example.

As shown in FIG. 2A, the program memory 226 and/or the RAM 230 may store various applications for execution by the microprocessor 228. For example, a user-interface application 236 may provide a user interface to the insurance provider server 102, which user interface may, for example, allow a network administrator to configure, troubleshoot, or test various aspects of the server's operation, or otherwise to access information thereon. A server application 238 may operate to generate and transmit insurance quotes and/or offers to the online retailer server 104 and receive information from the user transmitted back to the insurance provider server 102 via the online retailer server 104, as described below. The server application 238 may be a single module 238 or a plurality of modules 238A, 238B.

While the server application 238 is depicted in FIG. 2A as including two modules, 238A and 238B, the server application 238 may include any number of modules accomplishing tasks related to implantation of the insurance provider server 102. By way of example, the module 238A may include the insurance eligibility determination module 134, the module 238B may include the insurance risk assessment module 136, and/or a third module 238C (not shown) may include the offer generation module 138.

B. Exemplary Online Retailer Server

Figure 2B:
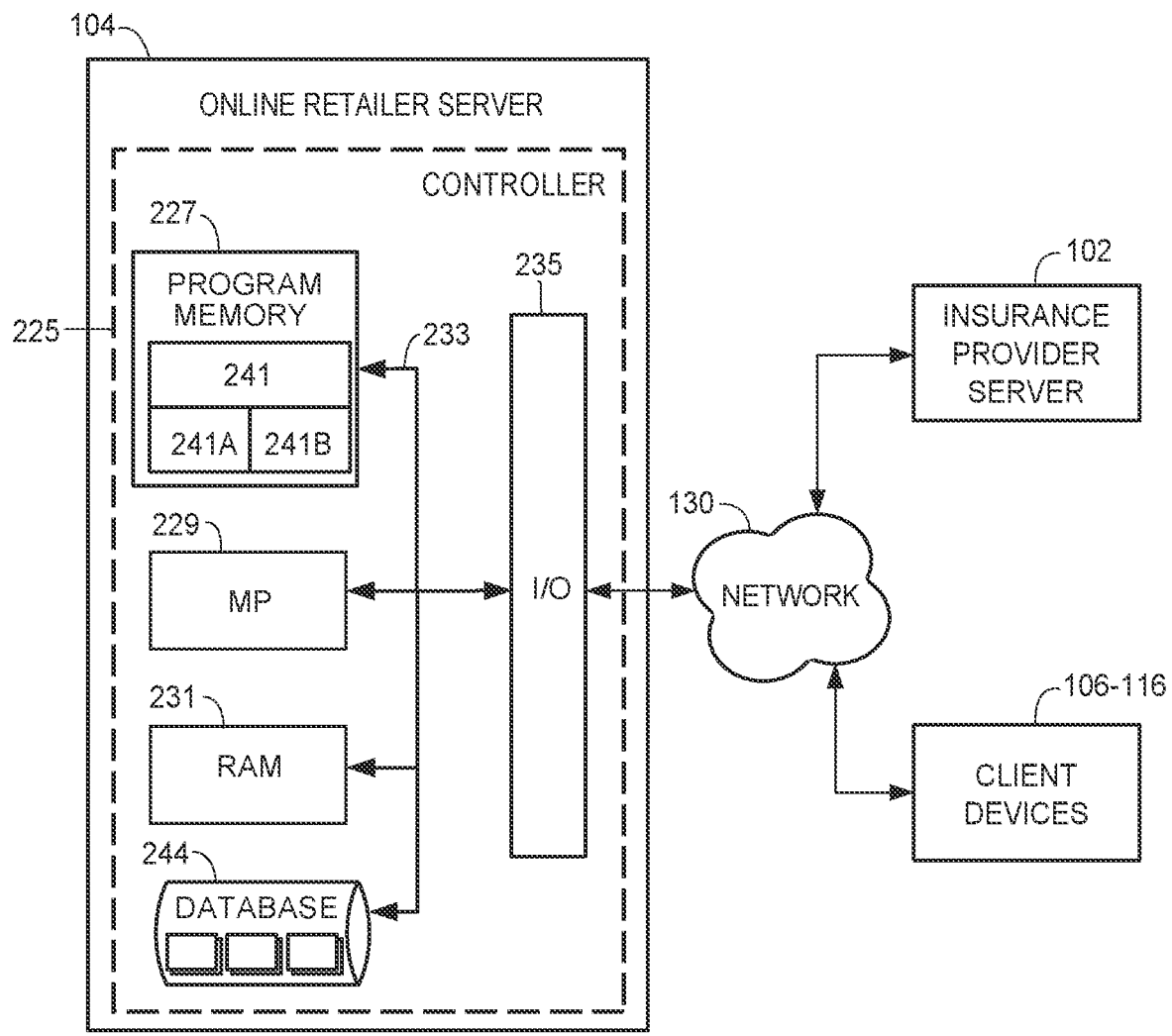
FIG. 2B illustrates a block diagram of an exemplary online retailer server in accordance with an exemplary aspect of the present disclosure.

Turning now to FIG. 2B, the online retailer server 104, may include a controller 225. The controller 225 may include a program memory 227, a microcontroller or a microprocessor (MP) 229, a random-access memory (RAM) 231, and/or an input/output (I/O) circuit 235, all of which are interconnected via an address/data bus 233. In some embodiments, the controller 225 may also include, or otherwise be communicatively connected to, a database 244 or other data storage mechanism (e.g., one or more hard disk drives, optical storage drives, solid state storage devices, etc.). The database 244 may include customer web profiles, product data, mobile device application data, web page templates and/or web pages, and other data necessary to interact with the user through the network 130. It should be appreciated that although FIG. 2B depicts only one microprocessor 229, the controller 225 may include multiple microprocessors 229. Similarly, the memory of the controller 225 may include multiple RAMs 231 and/or multiple program memories 227. Although FIG. 2B depicts the I/O circuit 235 as a single block, the I/O circuit 235 may include a number of different types of I/O circuits. The controller 225 may implement the RAM(s) 231 and/or the program memories 227 as semiconductor memories, magnetically readable memories, and/or optically readable memories, for example.

As shown in FIG. 2B, the program memory 227 and/or the RAM 231 may store various applications for execution by the microprocessor 229. A server application 241 operates to populate and transmit client application data and/or web pages and receive information from the user transmitted back to the online retailer server 104, as described below. The server application 241 may be a single module 241 or a plurality of modules 241A, 241B. While the server application 241 is depicted in FIG. 2B as including two modules, 241A and 241B, the server application 241 may include any number of modules accomplishing tasks related to implantation of the online retailer server 104. By way of example, the module 241A may transmit user history information for a customer to the insurance provider server 102, while the module 241B may communicate with the mobile device 112 (or any of the client devices 106-116) to receive an online payment.

C. Exemplary Mobile Device

Figure 2C:
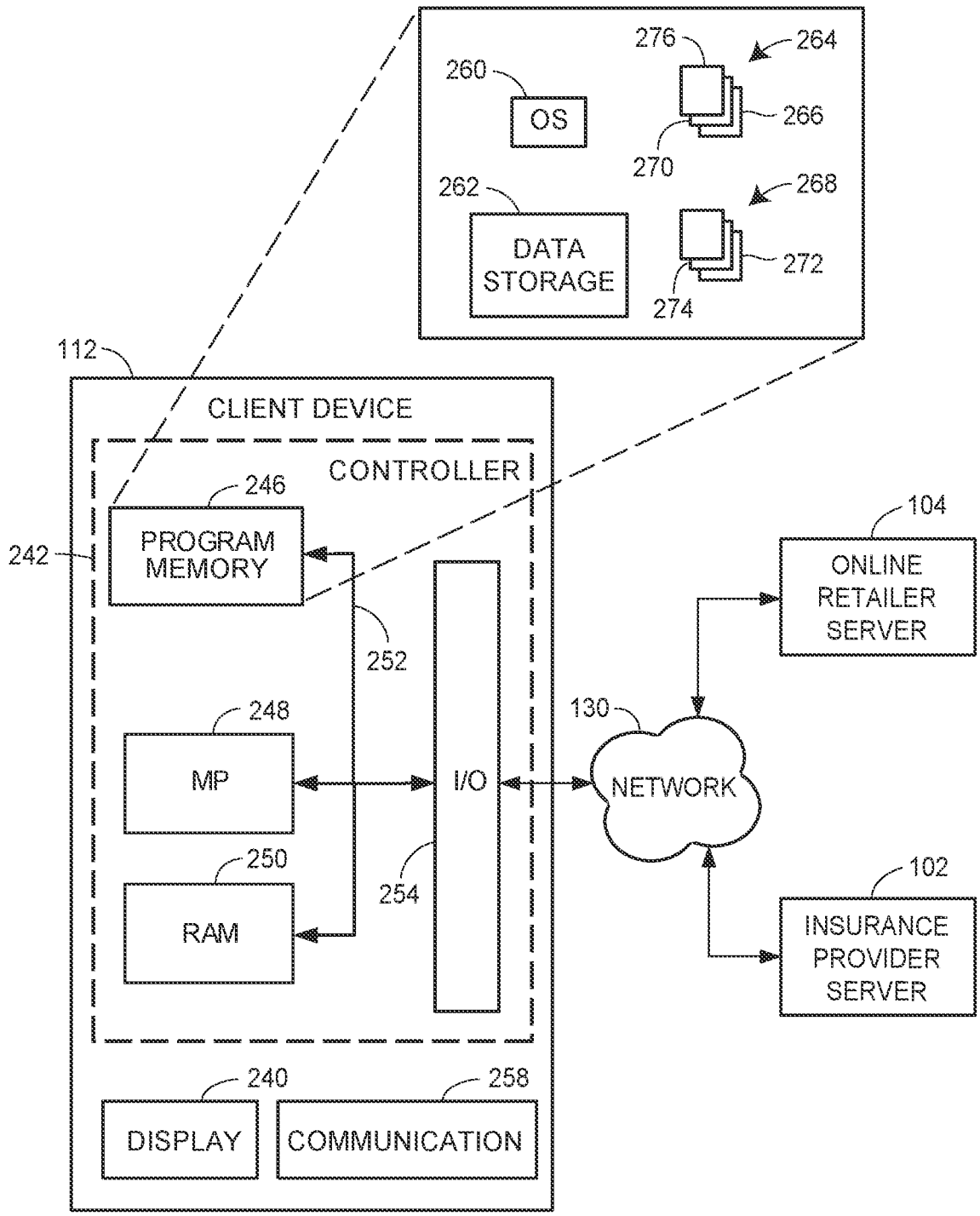
FIG. 2C illustrates a block diagram of an exemplary mobile device in accordance with an exemplary aspect of the present disclosure.

Referring now to FIG. 2C, the mobile device 112 (or any of the client devices 106-116) may include a display 240, a communication unit 258, a user-input device (not shown), and, like the insurance provider server 102, a controller 242. Similar to the controller 224, the controller 242 may include a program memory 246, a microcontroller or a microprocessor (MP) 248, a random-access memory (RAM) 250, and/or an input/output (I/O) circuit 254, all of which are interconnected via an address/data bus 252. The program memory 246 may include an operating system 260, a data storage 262, a plurality of software applications 264, and/or a plurality of software routines 268. The operating system 260, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 262 may include data such as user profiles, application data for the plurality of applications 264, routine data for the plurality of routines 268, and/or other data necessary to interact with the insurance provider server 102 and/or the online retailer server 104 through the digital network 130. In some embodiments, the controller 242 may also include, or otherwise be communicatively connected to, other data storage mechanisms (e.g., one or more hard disk drives, optical storage drives, solid state storage devices, etc.) that reside within the mobile device 112.

The communication unit 258 may communicate with the insurance provider server 102 and/or the online retailer server 104 via any suitable wireless communication protocol network, such as a wireless telephony network (e.g., GSM, CDMA, LTE, etc.), a wi-fi network (802.11 standards), a WiMAX network, a Bluetooth network, etc. The user-input device (not shown) may include a "soft" keyboard that is displayed on the display 240 of the mobile device 212, an external hardware keyboard communicating via a wired and/or a wireless connection (e.g., a Bluetooth keyboard), an external mouse, and/or any other suitable user-input device.

As discussed with reference to the controller 224, it should be appreciated that although FIG. 2C depicts only one microprocessor 248, the controller 242 may include multiple microprocessors 248. Similarly, the memory of the controller 242 may include multiple RAMs 250 and/or multiple program memories 246. Although the FIG. 2C depicts the I/O circuit 254 as a single block, the I/O circuit 254 may include a number of different types of I/O circuits. The controller 242 may implement the RAM(s) 250 and/or the program memories 246 as semiconductor memories, magnetically readable memories, and/or optically readable memories, for example.

The one or more processors 248 may be adapted and/or configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and/or transmitting information from the mobile device 112.

One of the plurality of applications 264 may be a native application and/or web browser 270, such as Apple's Safari®, Google Android™ mobile web browser, Microsoft Internet Explorer® for Mobile, Opera Mobile™, that may be implemented as a series of machine-readable instructions for receiving, interpreting, and/or displaying web page information from the insurance provider server 102 and/or the online retailer server 104 while also receiving inputs from the user. Another application of the plurality of applications may include an embedded web browser 276 that may be implemented as a series of machine-readable instructions for receiving, interpreting, and/or displaying web page information from the servers 102 and/or 104. One of the plurality of routines may include a product selection routine 272 that receives a selection from a user of a product that the user wants to purchase and/or transmits the selection to the online retailer server 104 and/or the insurance provider server 102. Another routine in the plurality of routines may include a payment routine 274 that receives credit card data from a user, and/or transmits the credit card data to the online retailer server 104.

Preferably, a customer and/or a user may launch the client application 266 from a client device, such as one of the client devices 106-116, to communicate with the insurance provider server 102 and/or the online retailer server 104 to implement the insurance integration system 100. Additionally, the customer and/or the user may also launch or instantiate any other suitable user interface application (e.g., the native application or web browser 270, and/or any other one of the plurality of software applications 264) to access the insurance provider server 102 and/or the online retailer server 104 to realize the insurance integration system 100.

As used herein, the term "customer" indicates someone purchasing an online retail product from the online retailer. Moreover, the term "customer" is not limited to a single person, but may instead be any person or persons having a reason or desire to purchase one or more online retail products. Generally, the term "user" is used when referring to a person who is operating one of the client devices 106-116 and is not exclusive of the term "customer."

In one embodiment, as shown in FIG. 2C, to access the online retailer server 104, the user may execute the client application 266 on one of the web-enabled devices 106-116, such as the mobile device 112. Using the client application 266, the user may request server data (not shown) by navigating a series of client application screens, such as the product display screen 122 of the client application 266. FIGS. 3A-E depict client application pages and/or screens that the online retailer server 104 may transmit in various embodiments of the insurance integration system 100. However, the screens depicted in FIGS. 3A-E are merely illustrations of an exemplary embodiment. In some embodiments, the online retailer server 104 may transmit web pages.

In any event, the user may launch the client application 266 from one of the client devices 106-116 via any suitable manner, such as touch-selecting a client application icon (not shown) on the display 240 of the mobile device 212, double-clicking on the client application icon via a mouse of a computer 116 and/or a trackpad (not shown) of a laptop 114. After the user launches the client application 266, the product display screen of the client application 266 may be displayed to the user on the mobile device 112.

III. Exemplary Screenshots of a Web-Based Application

In the present aspects, the following screenshots shown in FIGS. 3A-3E are examples of what may be displayed to a user as part of a web-based application. In the present aspects, the following exemplary screenshots shown in FIGS. 3A-3E may be displayed using any suitable client device 106-116, such as a tablet computer 106, a cell phone 108, a PDA 110, a mobile device 112, a laptop computer 114, a desktop computer 116, a portable media player (not shown), a wearable computing device (not shown), smart glasses, smart watches, phablets, other smart devices, and/or devices configured for wired or wireless RF communication, for example, as shown in FIG. 1. As will be appreciated by those of ordinary skill in the relevant art(s), the exemplary screenshots shown in FIGS. 3A-3E are for illustrative purposes, and their associated functionality may be implemented using any suitable format and/or design for facilitating their corresponding described functionalities without departing from the spirit and scope of the present disclosure.

Furthermore, the present aspects of the web-application may be used by a customer to obtain any number and/or type of insurance policies which provide coverage for the insurable product. As will be appreciated by those of ordinary skill in the relevant art(s), any suitable number of interactive portions and/or fields may be presented to the customer based upon the particular type of policy the customer is applying for.

A. Exemplary Product Display Screen

Figure 3A:
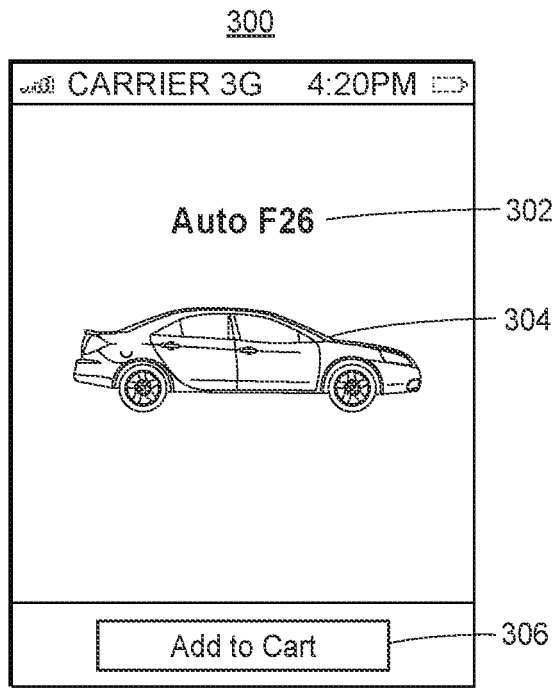
FIG. 3A depicts an exemplary product display screen of a client application in accordance with an exemplary aspect of the present disclosure.

With reference now to FIG. 3A, a product display screen 300 may include indicators 302, 304 for one or more products sold by the online retailer and/or by private sellers selling products on the online retailer's website. An indicator for a product may be, for example, an image of the product 304, text describing the product 302, a product identification number (e.g., Vehicle Identification Number (VIN)), and/or any other suitable indicator which identifies a product. Moreover, the product display screen 300 may also include information about the product such as reviews for the product, product specification information, etc. Additionally, the product display screen 300 may include a user control for selecting each displayed product for initiating the online purchase of the product. For example, the user control may be an "Add to cart" button 306, may be a checkbox, may be a drop down menu for selecting a quantity of the product, etc. In other embodiments, the customer may select the product by touch-selecting and/or double-clicking on the indicator for the product. While the product display screen 300 depicts one product, any suitable number of products may be depicted on the product display screen 300.

B. Exemplary Order Review Screen

Figure 3B:
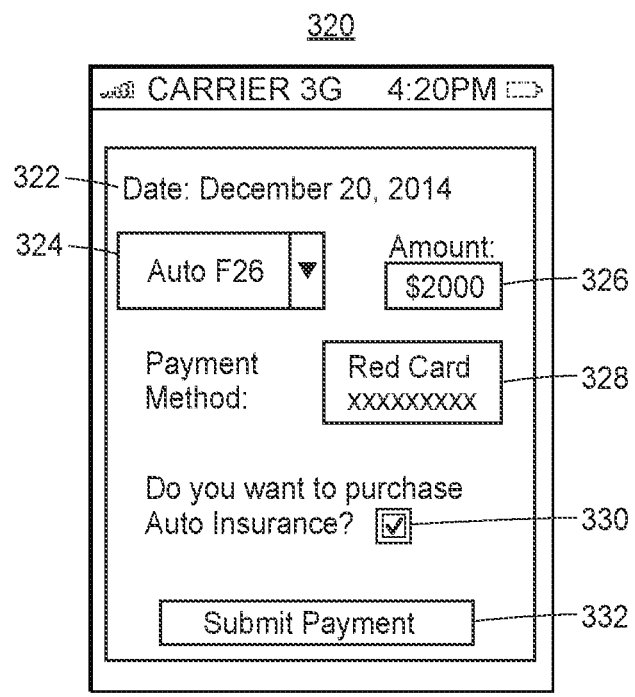
FIG. 3B depicts an exemplary order review screen of a client application in accordance with an exemplary aspect of the present disclosure.

When the user selects a product and initiates a purchase, the client application 266 may display an order review screen 320, such as that depicted in FIG. 3B. Moreover, the online retailer server 104 may determine whether the product is an insurable product corresponding to one of the insurance policies offered by the insurance provider, and/or may transmit an indication of the product to the insurance provider server 102. The online retailer server 104 may also transmit user history information for the user to the insurance provider, such as for example, a business approval rating from other customers on the online retailer web page, a number of times the user has entered into a transaction on the online retailer's website, and/or any other suitable user history information.

The order review screen 320 may include the date 322, an indication of the product to be purchased 324 (e.g., the name of the product), a price for the product 326, and/or user controls for entering a payment method 328. Moreover, if the insurance provider server 102 determines the user is eligible to purchase insurance for the insurable product, the insurance provider server 102 may transmit an offer to purchase insurance to the online retailer server 104, which may in turn transmit the offer 330 to be displayed on the order review screen 320. A user control such as a checkbox, drop-down menu, etc., may be included for the user to accept or decline the offer. In some embodiments, the insurance provider server 102 may transmit the offer to purchase insurance to the online retailer server 104 before determining whether the user is eligible to purchase insurance. Furthermore, a "Submit Payment" button 332 may also be included in the order review screen 320 for the user to submit a payment to purchase the insurable product. The order review screen 320 is merely one example of an order review screen which may be displayed when a user selects a product. In some embodiments, the order review screen may include an indication of the insurable product and/or the offer to purchase insurance.

C. Exemplary Insurance Coverage Selection Screen

If the user accepts the offer to purchase insurance with the insurance product, the client application 266 may display an insurance coverage selection screen 340 as depicted in FIG. 3C. In other embodiments, when the user accepts the offer to purchase insurance, the user may complete the payment for the insurable product and after the payment process is completed, the client application 266 may display the insurance coverage selection screen 340. In yet another embodiment, the client application 266 may display the offer to purchase insurance for the insurable product on a separate screen (not shown) before or after the user completes the payment for the insurable product.

In any event, the insurance coverage selection screen 340 may include several types of insurance coverage which may be purchased by the user. For example, if the insurable product is an automobile, the insurance provider server 102 may determine the user is eligible to purchase collision insurance 342, comprehensive insurance 344, liability insurance 346, uninsured motor vehicle insurance, etc. For each type of insurance coverage, the insurance provider server 102 may determine a purchase price for the type of insurance coverage (e.g., a monthly premium) based upon insurance risk information for the user. Each monthly insurance premium 350 (e.g., $20 per month for collision insurance) may be displayed with its respective type of insurance coverage on the insurance coverage selection screen 340, as well as a user control 352 for selecting whether to accept or decline the type of insurance coverage. For example, the user control may be a drop down menu, may be a checkbox, etc. In any event, the insurance coverage selection screen 340 may also include a sum total 354 of each of the monthly premiums for types of insurance coverage selected by the user. An "Add to Cart" button 348 may also be included for purchasing the selected types of insurance coverage. Once the user selects whether to accept or decline each type of insurance coverage, the client application 266 may display an additional order review screen 360 as depicted in FIG. 3D.

D. Exemplary Additional Order Review Screen

As FIG. 3D illustrates, the additional order review screen 360 may display the order information 362. The order information may include the name of the product 364, the payment amount 366 for the product, the name of the insurance policy such as "Auto Insurance" 374, the payment amount for the insurance 376, a sum total payment amount for the product and the insurance 378, the date of the payment 370, and/or user controls for entering payment method information 368. For example, the user may pay with a credit card, a debit card, a bank account, coupons, gift certificates, rewards points from the online retailer, promotion codes, etc. The order information may also include a "Submit Payment" button 372.

When the user decides to submit the payment, the payment name, the payment information (e.g., credit card data) and/or the payment amount may be transmitted to the online retailer server 104, the insurance provider server 102, and/or a combination of the online retailer server 104 and the insurance provider server 102. For example, the online retailer server 104 may receive the total payment, and/or may transmit the amount of the purchase price for the insurance policy or some portion thereof to the insurance provider. In other embodiments, the user may submit two separate payments, one for the product and another for the insurance policy, for example, using two separate order review screens. The additional order review screen 360 is merely one example of an additional order review screen which may be displayed after a user selects an insurance policy to purchase. In other embodiments, the additional order review screen may include the name of the insurance policy, the payment amount for the insurance policy, and/or a payment method.

In any event, if the credit card is approved, the online retailer server 104 may send an order confirmation screen (not shown) to the client device 112 indicating the amount charged to the credit card, an indication of the credit card charged, for example, the last four digits of the credit card number, and/or an indication that the transaction was approved. On the other hand, if the credit card is declined, the online retailer server 104 may send an error screen (not shown) indicating the credit card was declined and requesting the user to select a different payment method.

In some embodiments, the insurance risk information for a user may be obtained from the online retailer server 104 and/or from a third party such as a credit reporting agency, the DMV, etc. In other embodiments, the insurance risk information may be obtained from the user. In such an embodiment, the insurance provider server 102 may transmit an insurance application screen 380 to the user when the user accepts the offer to purchase insurance. The client application 266 may display the insurance application screen 380 as depicted in FIG. 3E.

E. Exemplary Insurance Application Screen

As FIG. 3E illustrates, the insurance application screen 380 may include several user controls for entering customer insurance risk information such as a name of the customer 382, an address 384, a date of birth 386, a marital status 388, a gender 390, a number of car accidents that the user has been in 396, etc. The insurance application screen 380 may also include user controls for entering product insurance risk information such as a vehicle make, model and/or year 392 for the automobile purchased via the online retailer, a number of antitheft devices in the vehicle 394, a number of safety features in the vehicle (not shown), etc. Moreover, the insurance application screen 380 may include user controls for entering any other customer and/or product information which may be used to assess the risk of insuring the product and/or customer. The user control for each of these fillable items may be a drop-down menu, may be a checkbox, may be a free form text field, etc. In some embodiments, the insurance provider server 102 may pre-fill some of the insurance information. For example, the insurance provider server 102 may obtain the make, model and/or year of the purchased vehicle from the online retailer server 104 and as a result, may pre-fill the vehicle make, model and/or year application fields on the insurance application screen 380. The insurance application screen 380 may also include a "Submit" button 398.

As noted herein, the present embodiments may also be utilized for insurable products other than vehicles, such as with antiques, jewelry, coins, paintings, electronics, televisions, etc. In addition or alternatively to asking for vehicle make and model, the insurance application screen 380 may ask for (i) an identification of an item to be purchased and insured, such as via a drop down menu or text entering; (ii) an estimated value and/or replacement cost of the item; (iii) a purchase price of the item; (iv) a condition of the item (new, used, etc.); and/or (v) other conditions or statuses of the item to facilitate determining availability of insurance for the item and/or determining an appropriate insurance quote for the item.

IV. Exemplary Sequence Diagram for Insurance Integration

Figure 4:
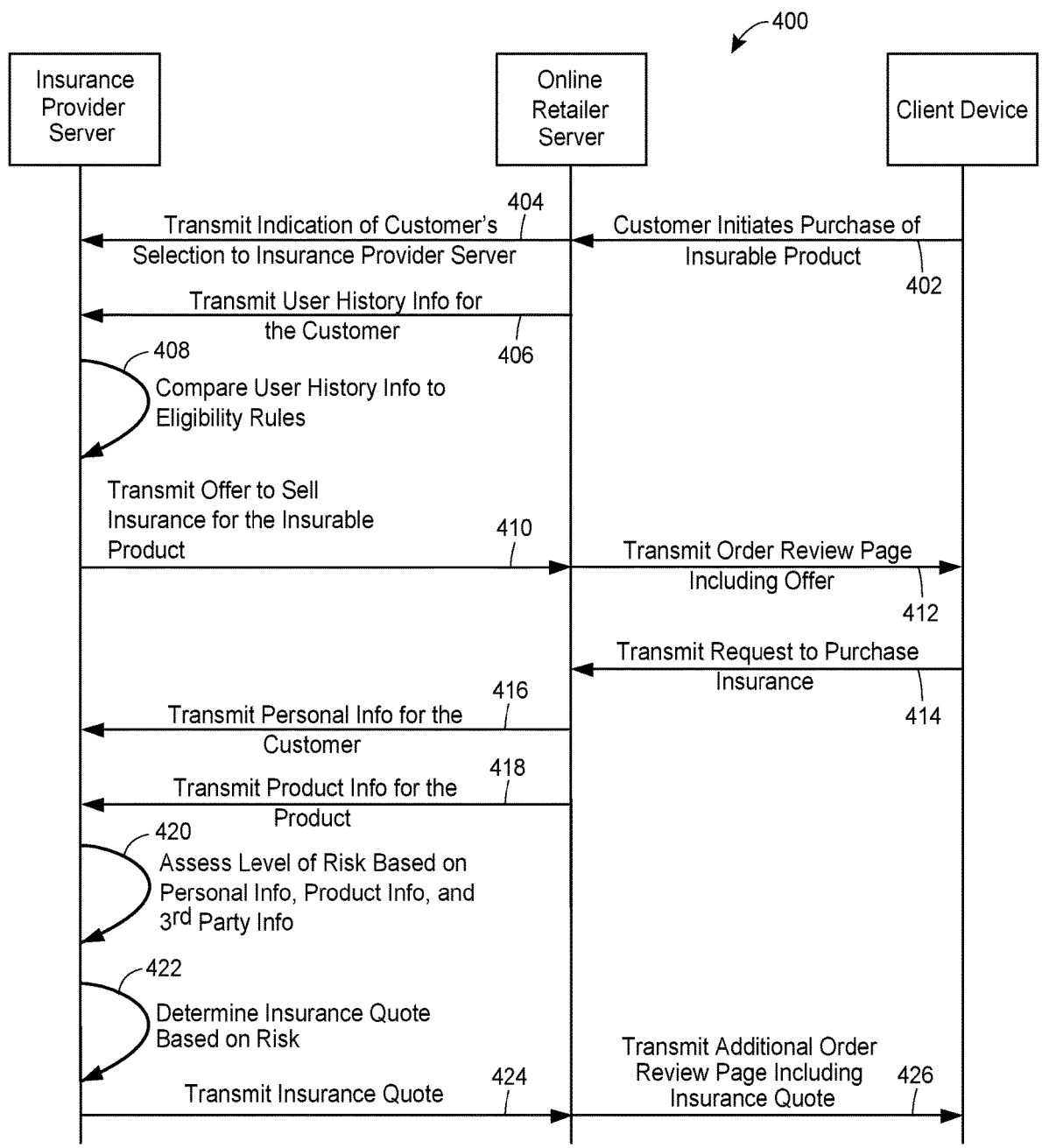
FIG. 4 depicts an exemplary interaction between the customer, the insurance provider server and the online retailer server when a customer initiates the purchase of an insurable product online in accordance with an exemplary aspect of the present disclosure.

FIG. 4 depicts an exemplary interaction 400 between the client device, the insurance provider server, and the online retailer server when a user initiates a purchase of an insurable product. When the user (the customer) finds a product on an online retailer website and/or application that she would like to purchase, the user may initiate the purchase 402, for example, by selecting an "Add to Cart" button on one of the client devices 106-116 as shown in FIG. 3A.

The online retailer server may then determine whether the product is an insurable product. For example, the insurance provider may provide indications of types of products which the insurance provider insures, and the online retailer server may compare the selected product and/or product information for the selected product to the types of products insured by the insurance provider. If there is a match, the online retailer server may determine that the product is an insurable product and/or may transmit an indication of the customer's selection to the insurance provider server 404. In other embodiments, the online retailer server may determine that any product which is capable of being insured against loss and/or harm is an insurable product. In any event, an indication of the customer's selection may include the type of insurable product selected by the customer (e.g., an automobile, a home, a condominium, an apartment rental, a motorcycle, a boat, a snowmobile, etc.), the date and/or time of the selection, etc.

The online retailer server may also transmit user history information for the customer to the insurance provider server 406. User history information may include a name of the user, a number of transactions completed by the user through the online retailer, a business approval rating for the user, a credit rating for the user, a verified mailing address and/or payment method, etc. The business approval rating may be based upon customer satisfaction of other users who conducted business with the customer through the online retailer, and/or may be based upon the satisfaction of the online retailer with the customer. For example, if the customer agreed to buy a product from another user and did not pay for the product or contact the other user, the customer's business approval rating would likely be reduced.

Moreover, if the customer consistently paid the online retailer for the products she purchased in full, the customer's business approval rating may be high. The business approval rating may be represented by a numeric score, for example from one to a hundred, may be a percentage, may be a category from a set of categories such as "High," Medium," and/or "Low," may be a number of stars, and/or may be represented in any other suitable manner.

The insurance provider server, and/or in some embodiments, the insurance eligibility determination module 134, may generate a set of eligibility rules for determining whether the customer is eligible to receive an offer to purchase insurance for the insurable product. In some embodiments, the set of eligibility rules may be stored in the insurance database 124 of FIG. 1. The insurance provider server may store a separate set of eligibility rules for each type of insurance policy (e.g., a set of eligibility rules for auto insurance, a set of eligibility rules for homeowners' insurance, etc.), and/or may store one set of eligibility rules for all insurance policies.

The set of eligibility rules may include one or several predetermined eligibility thresholds, each corresponding to a different eligibility factor for determining whether the customer is eligible to purchase insurance. Eligibility factors may include a number of transactions that the customer has made through the online retailer, a business approval rating, a credit rating, identity verification information such as a verified mailing address and/or payment method, and/or any other suitable factor which may indicate that the customer is likely to pay the premiums for the insurance.

For example, the set of eligibility rules may require that a customer has made 100 or more transactions through the online retailer, has a business approval rating of at least 97 percent, a credit rating of at least 650 or other predetermined threshold, and/or the online retailer has verified the customer's mailing address. Moreover, the location of the customer's place of residence may also be a factor in determining eligibility. For example, an insurance provider may not want to insure more than a threshold percentage of homes within a neighborhood. If the offer is for homeowner's insurance and the customer's home is in a neighborhood in which the insurance provider insures the threshold percentage of homes, the customer may not be eligible to receive an offer to purchase homeowner's insurance. Additionally, the customer's address and/or other user history information may be compared to the insurance provider's customer records, for example, in the insurance database 124. In this manner, the insurance provider server may suppress offers for existing customers in certain situations. For example, if the existing customer has auto insurance and purchases a car though the online retailer, the insurance provider server may suppress an offer for an auto insurance policy because insurance coverage for the additional car would have to be combined with the previous auto insurance policy.

In some embodiments, the set of eligibility rules may be scaled such that customers who exceed one predetermined eligibility threshold by a wide margin may be determined eligible even if they do not exceed the predetermined eligibility threshold for every eligibility factor. For example, a customer with a verified mailing address, a credit rating of 800 and/or a business approval rating of 100 percent may be determined eligible even if she only conducted 80 transactions through the online retailer. In other embodiments, each eligibility factor may be weighted, scaled, etc., to determine whether the customer is eligible to purchase insurance.

In any event, the user history information for the customer may be compared to the generated set of eligibility rules 408, for example, by the insurance eligibility determination module 134. If the customer's user history information meets each of the requirements set by the eligibility rules, the insurance provider server may transmit an offer to sell insurance for the insurable product 410 to the online retailer server to be displayed on an order review page and/or application screen. The present aspects that utilize user history information from the online retailer server advantageously allow for a quick and accurate determination of customer eligibility, improving processing speed as well as the accuracy of the information received.

In other embodiments, the insurance provider server may transmit the offer before determining eligibility. In such an embodiment, eligibility may be determined after the customer transmits a request to purchase insurance.

In any event, the online retailer server may transmit the order review page including the offer, to the client device 412. In some embodiments, if the insurance provider server does not receive all of the necessary user history information to determine whether the customer is eligible (e.g., does not receive an indication of a verified mailing address), the insurance provider server may transmit the offer with a disclaimer stating that the offer is pending based upon the customer's answers to an inquiry by the insurance provider. If the customer accepts the pending offer, the insurance provider may transmit additional questions to be displayed on the client device, and the customer's answers may be received as user history information and compared to the set of eligibility rules.

When the customer transmits a request to purchase insurance 414 to the online retailer server, for example, by selecting the checkbox 330 in FIG. 3B or in any other suitable manner, the online retailer server may transmit personal information for the customer 416 and/or product information for the insurable product 418 to the insurance provider server and/or in some embodiments the insurance risk assessment module 136.

Personal information for the customer (also referred to herein as "customer insurance risk information") may include the customer's name, date of birth, address, marital status, gender, contact information such as an email address and/or phone number, household information, type of residence, military deployment information, and/or any other information which may be used to assess a level of risk for insuring the customer. Moreover, the personal information received may also be specific to the type of product covered by the insurance. For example, if the type of product is a motor vehicle such as a car, the online retailer server may also transmit driving history information for the customer such as the number of accidents that the customer has been in, a number of motor vehicles owned by the customer, an expected annual mileage for the vehicle, a primary use for the vehicle, whether the vehicle is financed, etc. In some embodiments, insurance risk information may be determined based upon the personal information. For example, a risk location for the customer may be based upon the customer's address.

Product information for the insurable product (also referred to herein as "product risk insurance information") may include a type of product such as motor vehicle, home, boat, snowmobile, etc., a purchase price for the product, and/or a product name, product number and/or any other product identification. The product information received may also be specific to the type of product. Using the same example as above, if the type of product is a motor vehicle, the online retailer may also transmit a vehicle identification number, a year, make, and/or model for the vehicle, vehicle purchase history for the automobile, an indication of the antitheft devices in the automobile, an indication of the safety features in the automobile, etc. If the type of product is a home, the product information may include the size of the home, a number of stories for the home, a number of bedrooms and/or bathrooms for the home, the year the home was built, the overall condition of the home, additional liability hazards such as a swimming pool, etc. In some embodiments, insurance risk information may be determined based upon the product information.

Some or all of the personal and/or product information may be received from the online retailer server. For example, customers may be required to enter personal information to make a purchase through the online retailer. Moreover, the online retailer and/or third-party sellers may be required to enter product information on the online retailer web page so the buyer has enough information before making a purchase. However, while the product and/or personal information may be received from the online retailer server, the online retailer server may not include all of the product and/or personal information necessary for the insurance provider server to appropriately assess the risk in insuring the product for the customer.

In some embodiments, the insurance provider server may receive additional and/or alternative product and/or personal information from third parties such as Motor Vehicle Reports (MVRs) from the DMV, Loss History Reports (LHRs) from a loss history reporting agency, credit reports from a credit reporting agency, etc. In other embodiments, the insurance provider server and/or the insurance risk assessment module 136 may also receive product and/or personal information from the user if the information is not obtained automatically from the online retailer server and/or a third party. For example, a user may enter personal and/or product information via the insurance application screen 380 of FIG. 3E.

The insurance provider server, and in some embodiments the insurance risk assessment module 136, may use the personal information and/or the product information to assess a level of risk 420 in insuring the customer's insurable product. In some embodiments, the insurance provider server may compare the customer's personal information to the insurance provider's customer records, for example, in the insurance database 124. If the customer has previously been insured by the insurance provider for a same or different type of insurance policy, the level of risk may be assessed based upon the insurance provider's past experiences with the customer. For example, if the customer previously qualified for a safe driver discount, the customer may be at low risk for an auto insurance policy.

Moreover, if the customer has not previously been insured by the insurance provider, but based upon the customer's personal information the insurance provider server determines that a family member of the customer has been insured (e.g., by name, by mailing address, etc.), the level of risk for the customer may be assessed at least partially based upon the family member. For example, if the family member has purchased auto insurance for two vehicles and the customer wants to purchase auto insurance for a third vehicle, the level of risk may be reduced. This is because a household which owns three vehicles is less likely to drive any one of the three vehicles than a household which owns one vehicle.

Furthermore, the level of risk may be adjusted based upon any other personal and/or product information for the customer and/or the insurable product, respectively. For example, for a homeowner's insurance policy, the level of risk for a home built 30 years ago in poor condition that has two bedrooms and ten people living in the home may be very high. On the other hand, the level of risk may be very low for a new home in excellent condition that has four bedrooms and three people living in it, where the homeowner has excellent credit and has never made an insurance claim. The level of risk may be a numeric score (e.g., from one to a hundred), may be a percentage, may be a category from a set of categories such as "Very High," "High," "Medium," and/or "Low," and/or may be any other suitable indicator of a level of risk.

Since the premiums quoted may be based upon the risk assessments, the present aspects that utilize automatically transmitting/receiving personal and/or product information to generate risk assessments advantageously allow for a fast and accurate premium quote to be offered to the customer.

Once the level of risk is assessed, the insurance provider server, and in some embodiments the offer generation module 138, may determine an insurance quote based upon the level of risk 422. The insurance quote may be separated into several types of coverage which the customer may choose from. For example, if the type of insurance policy is auto insurance, the insurance provider server may determine separate insurance quotes for liability coverage, medical payments coverage, collision coverage, comprehensive coverage, uninsured motor vehicle coverage, underinsured motor vehicle coverage, car rental and/or travel expenses coverage, etc. The insurance quote may be a purchase price such as a monthly premium for each type of coverage and/or a total monthly premium for all selected types of coverage. The insurance provider server may transmit the insurance quote to the online retailer server 424 to be displayed on the client device in an additional order review page 426 as depicted in FIG. 3D. In other embodiments, the insurance provider server may transmit the insurance coverage selection screen 340 to the client device for the user to accept or decline each type of coverage.

After the user reviews the additional order review page including the product to be purchased, the purchase price for the product, the insurance policy and/or types of coverage for the insurance policy, the purchase price for the insurance policy, the payment method, etc., the user may select a "Submit Payment" button to purchase both the product and the insurance policy. In some embodiments, the online retailer may receive the total payment (in some instances the online retailer may forward the amount of the purchase price for the product or some portion thereof to a third-party seller), and/or may transmit the amount of the purchase price for the insurance policy or some portion thereof to the insurance provider. For example, the online retailer may receive a commission on the sale of the insurance policy.

In some scenarios, a higher monthly premium for the insurance policy may correspond to a higher commission for the online retailer (e.g., a five percent commission). In other scenarios, a lower monthly premium for the insurance policy may correspond to a higher commission for the online retailer because the risk is lower for the insurance provider.

In other embodiments, the purchase price for the product may be transmitted to the online retailer and the purchase price for the insurance policy may be transmitted separately to the insurance provider. In yet other embodiments, the user may submit two separate payments, one for the product and another for the insurance policy, for example, using two separate order review screens.

Furthermore, in some embodiments after the purchase has been made, the insurance provider server may assign an insurance agent to the insurance policy and may transmit the insurance policy, the user history information, the personal information, the product information, the types of coverage elected, etc., to the insurance agent. The insurance agent may then adjust the premiums, for example, based upon further and/or corrected information discovered by the insurance agent and/or for any other suitable reason. The insurance provider server may then transmit a notification to the customer that the premiums for the insurance policy have been adjusted, for example, via email, and/or adjustments to the premiums may be backdated such that the customer may receive a refund on the purchase price for the insurance policy.

V. Exemplary Flow Diagram for Web-Based Application

Figure 5A:
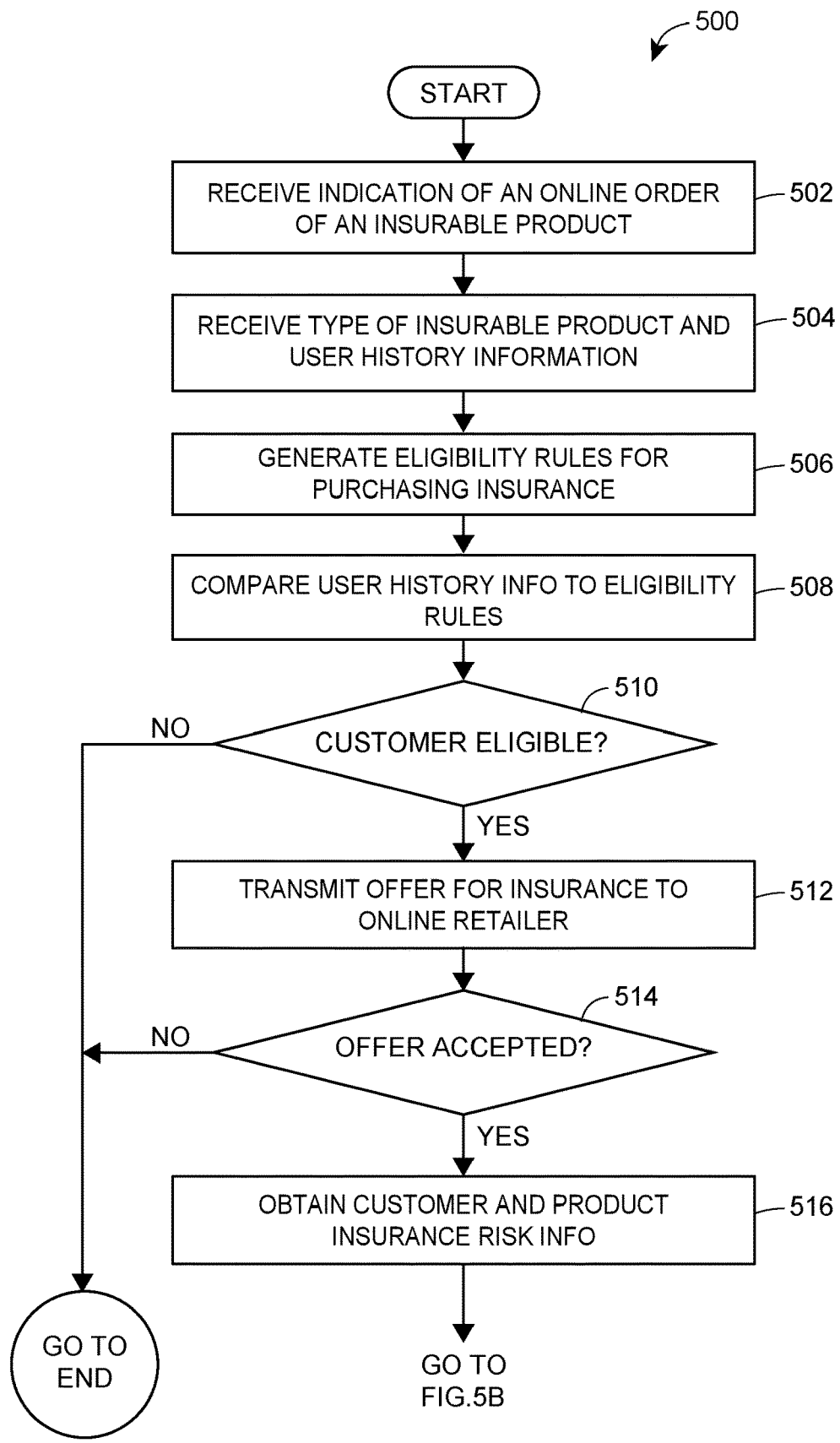
FIG. 5A depicts a flow diagram representing an exemplary server-side method for implementing the insurance integration system in accordance with an exemplary aspect of the present disclosure.

FIG. 5A depicts a flow diagram representing an exemplary method 500 for integrating an online insurance purchase with an online purchase of an insurable product. The method 500 may be executed on the insurance provider server 102, the online retailer server 104, or some combination of the insurance provider server 102 and the online retailer server 104. In some embodiments, the method 500 may be implemented in a set of instructions stored on a non-transitory computer-readable memory and executable on one or more processors of the insurance provider server 102. For example, at least a portion of the method 500 may be performed by the insurance eligibility determination module 134, the insurance risk assessment module 136, and/or the offer generation module 138 of FIG. 1A. In some embodiments, blocks 502-512 may be performed by the insurance eligibility determination module 134, blocks 514-520 may be performed by the insurance risk assessment module 136, and/or blocks 522-530 may be performed by the offer generation module 138.

At block 502, an indication of an online selection of an insurable product may be received in addition to a type of the insurable product and/or user history information for the customer who selected the insurable product (block 504). For example, the insurable product may be an automobile, a boat, a snowmobile, a motorcycle, real estate property, a personal article, etc. The user history information for the customer may include a name of the user, a number of transactions completed by the user through the online retailer, a business approval rating for the user, a credit rating for the user, a verified mailing address and/or payment method, etc.

The insurance provider server 102 may also generate a set of eligibility rules for purchasing insurance (block 506), and compare the user history information to the set of eligibility rules (block 508). For example, if the insurable product is a home, the set of eligibility rules may require that the customer has completed at least 100 transactions through the online retailer, that the customer has a business approval rating of at least 95 percent, that the home purchased by the customer is in a neighborhood having less than 20 percent of its properties insured by the insurance provider, and/or that the customer has a verified payment method for purchasing the insurance. Based upon the set of eligibility rules, the insurance provider server 102 may determine whether the customer is eligible to purchase insurance covering the insurable product. If the customer is not determined eligible the process may end. In some embodiments, if the information for determining eligibility is incomplete, the insurance provider server 102 may prompt the user with several questions, for example, through the online retailer web page to determine whether the customer is eligible to purchase insurance.

If the customer is (or may be) eligible, the insurance provider server 102 may transmit an offer to purchase insurance providing coverage for the insurable product (block 512). In some embodiments, the insurance provider server 102 may transmit the offer to the online retailer server 104 to be displayed on an order review screen. If the customer accepts the offer, for example, by selecting a checkbox and/or other user control on the client device 106-116, personal and/or product information may be obtained from the online retailer server (block 516).

Figure 5B:
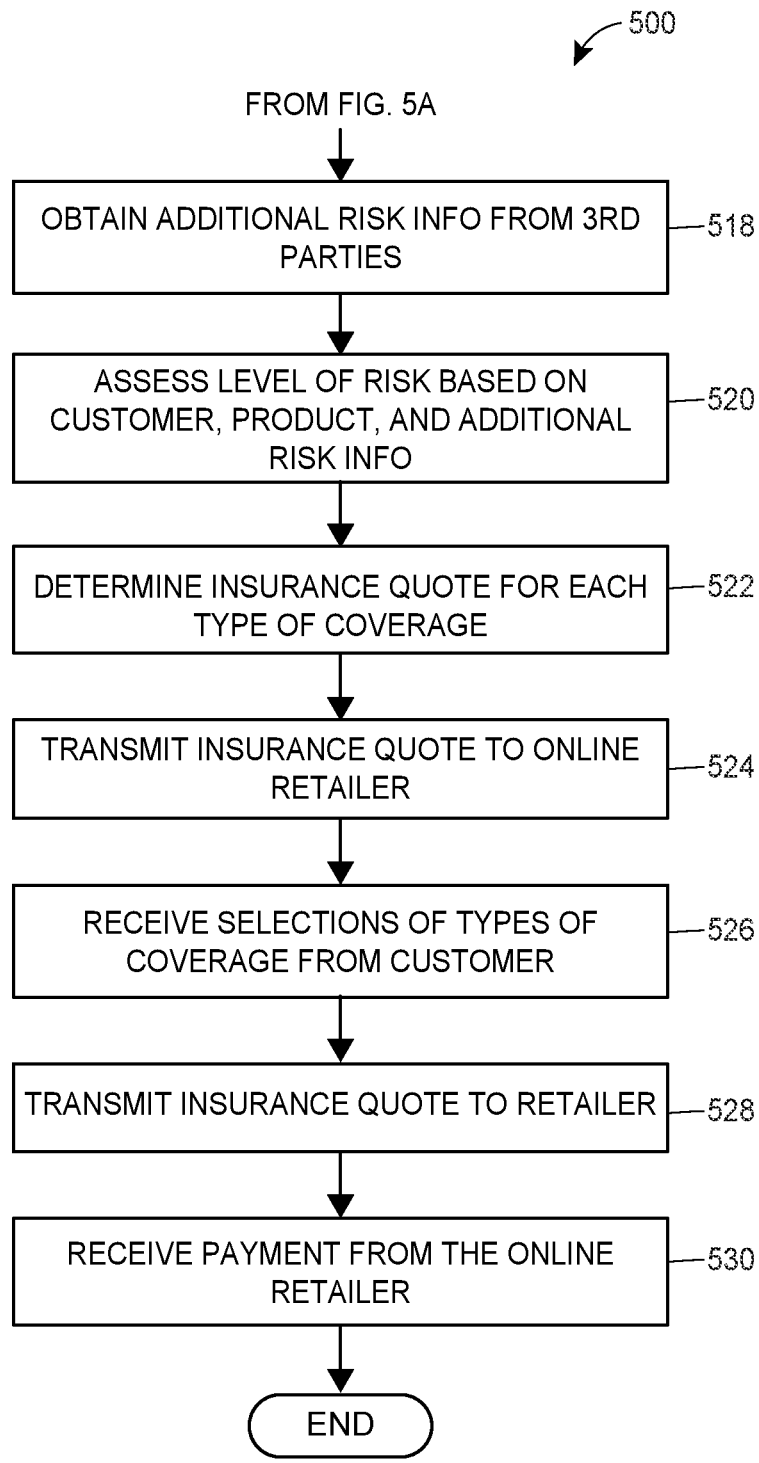
FIG. 5B depicts a continuation of the flow diagram in FIG. 5A of the exemplary server-side method for implementing the insurance integration system.

Moving on to FIG. 5B, additional product and/or personal information may be obtained from a third party (block 518) such as the DMV, a credit reporting agency, a loss history reporting agency, etc. In some embodiments, some of the personal and/or product information may also be obtained from the customer. The personal and/or product information obtained may depend upon the type of insurance policy which covers the insurable product.

For example, for a homeowner's insurance policy, personal information may include the customer's name, date of birth, address, marital status, gender, contact information such as an email address and/or phone number, household information, type of residence, military deployment information, whether the customer has filed claims on previous homes, etc. Product information may include the purchase price for the home, the address of the home, the size of the home, a number of stories in the home, a number of bedrooms and/or bathrooms in the home, the year the home was built, the overall condition of the home, whether the home is above or below ground, additional liability hazards such as a swimming pool, etc.

In some embodiments, some of the personal and/or product information may be used to determine insurance risk information. For example, the customer's mailing address may be used as a risk location for the customer. Moreover, the address of the purchased home may be used to determine whether the home is in a location at high risk for tornados, earthquakes, hurricanes, etc. In any event, a level of risk which may be a numeric score, percentage, category from a set of categories, etc., may be assessed based upon the personal and/or product information obtained at the insurance provider server (block 520).

The level of risk may be used to determine insurance premiums for various types of coverage within an insurance policy (block 522). For example, a customer with a high level of risk may be required to pay a very high premium, whereas a customer with a low level of risk may be required to pay a very low premium. The insurance quote for each type of coverage may be transmitted to the online retailer 104 to be displayed on an insurance coverage selection screen and viewed by the customer (block 524). The customer may then select to accept or decline each type of coverage, for example, by using a drop-down menu and/or other user control on the client device 106-116. The selected types of coverage may be received by the insurance provider server 102 (block 526), and an insurance quote representing the sum total of the insurance policy or some portion thereof for the selected types of coverage may be displayed on the client device 106-116 (block 528).

The online retailer 104 may then receive payment from the customer for both the product and the insurance policy, for example, when the customer selects the "Submit Payment" button. As a result, the online retailer 104 may transmit payment in the amount of the purchase price for the insurance policy or some portion thereof to the insurance provider (block 530). For example, the online retailer may receive a commission on the sale of the insurance policy that is proportional to the level of risk assessed for the customer. As a result, the online retailer may transmit payment to the insurance provider in the amount of the difference between the purchase price for the insurance policy and the commission. The method may include additional, fewer, or alternate actions, including those discussed elsewhere herein.

VI. Exemplary Method for Insurance Integration

In one aspect, a computer-implemented method for integrating an online insurance purchase with an online purchase of an insurable product may be provided. The method may include: (1) obtaining (via one or more processors, and/or wired or wireless communication and/or data transmission) an indication of an online selection of an insurable product by a customer, wherein the insurable product is selected via an online retailer; (2) receiving (via the one or more processors, and/or wired or wireless communication and/or data transmission from the online retailer) user history information corresponding to the customer; (3) determining (via the one or more processors) whether the customer is eligible for an online insurance purchase which provides coverage for the insurable product according to a set of eligibility rules, based upon the user history information corresponding to the customer; and/or when the customer is eligible for the online insurance purchase, the method may include: (4) receiving (via the one or more processors, and/or wired or wireless communication and/or data transmission) customer insurance risk information for the customer; (5) determining (via the one or more processors) a level of risk for insuring the customer based upon the customer insurance risk information; (6) determining (via the one or more processors) an insurance quote based upon the level of risk for insuring the customer; (7) transmitting (via the one or more processors, and/or wired or wireless communication and/or data transmission) an indication of an offer to provide insurance for the insurable product which is to be displayed in a first order review page, wherein the first order review page includes an indication of the insurable product; and/or (8) upon receiving a request from the customer to purchase the insurance, transmitting (via the one or more processors, and/or wired or wireless communication and/or data transmission) the insurance quote to be displayed in a second order review page to facilitate providing immediate, binding, and/or actionable insurance coverage for the insurable product at the time of purchase. The method may further include receiving (via the one or more processors, and/or wired or wireless communication and/or data transmission) an indication of a type of the insurable product; and/or receiving (via the one or more processors, and/or wired or wireless communication and/or data transmission) product insurance information for the insurable product wherein determining the level of risk for insuring the customer is further based upon at least one of: the type of the insurable product, or the product insurance risk information for the insurable product. The method may also include transmitting (via one or more processors, and/or wired or wireless communication and/or data transmission) an insurance coverage selection page including one or more types of insurance coverage provided corresponding to the insurance quote. The method may include additional, fewer, or alternate actions, including those discussed elsewhere herein.

For instance, the act of determining whether the customer is eligible for the online insurance purchase may include generating (via the one or more processors) the set of eligibility rules; and/or when the user history information matches the set of eligibility rules, determining that the customer is eligible for the online insurance purchase. The act of receiving customer insurance risk information for the customer may include automatically obtaining (via the one or more processors, and/or wired or wireless communication and/or data transmission) the customer insurance risk information from the online retailer.

On the other hand, the act of receiving customer insurance risk information for the customer may include transmitting (via the one or more processors, and/or wired or wireless communication and/or data transmission) an insurance application page including one or more user controls for entering customer insurance risk information; and/or receiving (via the one or more processors, and/or wired or wireless communication and/or data transmission) the customer insurance risk information from the customer via the insurance application page.

User history information may include at least one of: a number of transactions completed by the customer via the online retailer, a business approval rating, financial account information, employment history, and/or a credit rating. The set of eligibility rules may include at least one of: a predetermined threshold number of transactions made by the customer through the online retailer, a predetermined threshold approval rating for the customer, and/or a predetermined threshold credit rating for the customer.

The type of insurable product may include at least one of: an automobile, a boat, a snowmobile, a motorcycle, real estate property, and/or a personal article. When the insurable product is an automobile, the product insurance risk information for the insurable product may include at least one of: a vehicle identification number (VIN), vehicle purchase history for the automobile, a number of safety features in the automobile, and/or an indication of one or more antitheft devices in the automobile.

The second order review page may further include a purchase price for the insurable product, an overall purchase price including an aggregation of the insurance quote and the purchase price for the insurable product, and/or a payment information section for receiving payment information from the customer.

VII. Exemplary System for Insurance Integration

In one aspect, a system for integrating an online insurance purchase with an online purchase of an insurable product may be provided. The system may include a communication network, one or more processors communicatively coupled to the communication network, and/or a non-transitory, tangible computer-readable memory coupled to the one or more processors and storing machine readable instructions, that when executed by the one or more processors, may cause the system to perform various tasks. For example, the instructions may cause the system to: (1) receive, from an online retailer and via the communication network, an indication of an online selection of an insurable product by a customer, wherein the insurable product is selected via the online retailer; (2) receive, from the online retailer, user history information corresponding to the customer; and/or (3) determine whether the customer is eligible for an online insurance purchase which provides coverage for the insurable product according to a set of eligibility rules, based upon the user history information corresponding to the customer. When the customer is eligible for the online insurance purchase, the instruction may cause the system to: (4) receive customer insurance risk information for the customer; (5) determine a level of risk for insuring the customer based upon the customer insurance risk information; (6) determine an insurance quote based upon the level of risk for insuring the customer; (7) transmit, via the communication network, an indication of an offer to provide insurance for the insurable product to be displayed in a first order review page on a web-enabled device of the customer, wherein the first order review page includes an indication of the insurable product; and/or (8) upon receiving a request from the customer to purchase the insurance, transmit, via the communication network, the insurance quote to be displayed in a second order review page on the web-enabled device to facilitate providing immediate, binding, and/or actionable insurance coverage for the insurable product at the time of purchase. The system may include additional, fewer, or alternate components and/or functionality, including that discussed elsewhere herein.

For instance, the instructions may cause the system to receive an indication of a type of the insurable product, and/or receive product insurance information for the insurable product, wherein to determine the level of risk for insuring the customer is further based upon at least one of: the type of the insurable product, or product insurance risk information for the insurable product. The instructions may also cause the system to transmit an insurance coverage selection page including one or more types of insurance coverage provided corresponding to the insurance quote.

To determine whether the customer is eligible for the online insurance purchase, the instructions may cause the system to: generate the set of eligibility rules, and/or when the user history information matches the set of eligibility rules, determine that the customer is eligible for the online insurance purchase. To receive customer insurance risk information for the customer, the instructions may cause the system to: automatically obtain the customer insurance risk information from the online retailer or a third party.

On the other hand, to receive customer insurance risk information, the instructions may cause the system to: transmit an insurance application page including one or more user controls for entering customer insurance risk information, and/or receive the customer insurance risk information from the customer via the insurance application page.

User history information may include at least one of: a number of transactions completed by the customer via the online retailer, a business approval rating, financial account information, employment history, and/or a credit rating. The set of eligibility rules may include at least one of: a predetermined threshold number of transactions made by the customer through the online retailer, a predetermined threshold approval rating for the customer, and/or a predetermined threshold credit rating for the customer.

The type of insurable product may include at least one of: an automobile, a boat, a snowmobile, a motorcycle, real estate property, and/or a personal article. When the insurable product is an automobile, the product insurance risk information for the insurable product may include at least one of: a vehicle identification number (VIN), vehicle purchase history for the automobile, a number of safety features in the automobile, and/or an indication of one or more antitheft devices in the automobile.

The second order review page may further include a purchase price for the insurable product, an overall purchase price including an aggregation of the insurance quote and the purchase price for the insurable product, and/or a payment information section for receiving payment information from the customer.

VIII. Additional Considerations

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. The patent claims at the end of this patent application are not intended to be construed under 35 U.S.C. § 112(f) unless traditional means-plus-function language is expressly recited, such as "means for" or "step for" language being explicitly recited in the claim(s).

Accordingly, the term "online retailer," as used herein, may be used to refer to any individual, or business which sells, or provides services for selling, goods to consumers or businesses over the Internet. For example, online retailers may include dealer/broker websites as well as services that connect private sellers to private buyers.

As used herein, the term "insurable product" may be used to refer to property (personal or real estate) capable of being insured against loss or harm. For example, insurable products may include a home, a condominium, an apartment, an automobile, a motorcycle, a boat, a snowmobile, jewelry, furs, a camera, an instrument, furniture, silverware, art, collectibles, sports equipment, computer equipment, electronics, machinery, etc.

The term "insurance provider" as used herein, generally refers to a party and/or entity (e.g., a business and/or other organizational entity) that provides insurance products, e.g., by offering and/or issuing insurance policies. Typically, but not necessarily an insurance provider may be an insurance company. Further, an insurance provider may be any individual, group of individuals, company, corporation, and/or other type of entity that may issue insurance policies for customers, such as insurance policies associated with properties.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

We claim:

1. A computer-implemented method of integrating an online purchase of insurance with an online purchase of a retail product, the method executed by one or more processors of a client device programmed to perform the method, the method comprising:
receiving and presenting, via a web browser of a client device of a customer from an online retailer server, a first online retailer web page including one or more display elements associated with the retail product;
receiving, via the web browser, an indication of an online selection of the retail product by the customer via a first user control of the first online retailer web page;
transmitting, by the client device to the online retailer server, the indication of the online selection of the retail product;
receiving, at the client device, insurance coverage information from an insurance provider server for insuring the retail product including an insurance quote;
presenting, via the web browser, an insurance coverage selection web page including one or more types of insurance coverage provided corresponding to the insurance quote;
receiving, via the web browser, a selection of at least one of the one more types of insurance coverage;
transmitting, by the client device, the selection of the at least one type of insurance coverage to the online retailer server;
receiving and presenting, via the web browser, a second online retailer web page that displays (A) the insurance coverage information from the insurance provider server for the selected at least one type of insurance coverage and (B) at least one of the display elements from the first online retailer web page indicating information for the retail product; and
transmitting, by the client device to the online retailer server, payment information for purchasing the retail product and the selected at least one type of insurance coverage in a single payment.

2. The computer-implemented method of claim 1, wherein the insurance provider server determines whether the customer is eligible to purchase the insurance according to whether user history information of the customer matches a set of eligibility rules.

3. The computer-implemented method of claim 2, wherein user history information includes at least one of: a number of transactions completed by the customer via the online retailer, a business approval rating, financial account information, employment history, or a credit rating; and
wherein the set of eligibility rules includes at least one of:
a predetermined threshold number of transactions made by the customer through the online retailer,
a predetermined threshold approval rating for the customer, or
a predetermined threshold credit rating for the customer.

4. The computer-implemented method of claim 1, wherein the online retailer server obtains customer insurance risk information for the customer.

5. The computer-implemented method of claim 1, wherein the insurance provider server determines the insurance quote based upon a level of risk for insuring the customer that is based upon at least one of: a type of the retail product, or product insurance risk information for the retail product.

6. The computer-implemented method of claim 5, wherein the type of the retail product includes at least one of: an automobile, a boat, a snowmobile, a motorcycle, real estate property, or a personal article.

7. The computer-implemented method of claim 6, wherein the retail product is an automobile and wherein the product insurance risk information for the retail product includes at least one of: a vehicle identification number (VIN), vehicle purchase history for the automobile, a number of safety features in the automobile, or an indication of one or more antitheft devices in the automobile.

8. The computer-implemented method of claim 1, the method further comprising:
receiving and presenting, via the web browser from the online retailer server, an insurance application web page including one or more user controls for entering customer insurance risk information; and
transmitting, by the client device to the online retailer server, the customer insurance risk information from the customer via the insurance application web page.

9. A computer system for integrating an online purchase of insurance with an online purchase of a retail product, the system comprising:
a communication network;
one or more processors of a client device communicatively coupled to the communication network; and
a non-transitory computer-readable memory coupled to the one or more processors of the client device and storing thereon instructions that, when executed by the one or more processors, cause the system to:
receive and present, via a web browser of the client device from an online retailer server, a first online retailer web page including one or more display elements associated with the retail product;
receive, via the web browser, an indication of an online selection of the retail product by a customer via a first user control of the first online retailer web page;
transmit, to the online retailer server, the indication of the online selection of the retail product;
receive, from an insurance provider server, insurance coverage information for insuring the retail product including an insurance quote;
present, via the web browser, an insurance coverage selection web page including one or more types of insurance coverage provided corresponding to the insurance quote;
receive, via the web browser, a selection of at least one of the one more types of insurance coverage;
transmit the selection of the at least one type of insurance coverage to the online retailer server;
receive and present, via the web browser from the online retailer server, a second online retailer web page that displays (A) the insurance coverage information from the insurance provider server for the selected at least one type of insurance coverage, and (B) at least one of the display elements from the first online retailer web page indicating information for the retail product; and transmit, to the online retailer server, payment information for purchasing the retail product and the selected at least one type of insurance coverage in a single payment.

10. The system of claim 9, wherein the insurance provider server determines whether the customer is eligible to purchase the insurance according to whether user history information of the customer matches a set of eligibility rules.

11. The system of claim 10, wherein user history information includes at least one of: a number of transactions completed by the customer via the online retailer, a business approval rating, financial account information, employment history, or a credit rating; and
   wherein the set of eligibility rules includes at least one of:
      a predetermined threshold number of transactions made by the customer through the online retailer,
      a predetermined threshold approval rating for the customer, or
      a predetermined threshold credit rating for the customer.

12. The system of claim 9, wherein the online retailer server obtains customer insurance risk information for the customer.

13. The system of claim 9, wherein the insurance provider server determines the insurance quote based upon a level of risk for insuring the customer that is based upon at least one of: a type of the retail product, or product insurance risk information for the retail product.

14. The system of claim 13, wherein the type of the retail product includes at least one of: an automobile, a boat, a snowmobile, a motorcycle, real estate property, or a personal article.

15. The system of claim 14, wherein the retail product is an automobile and wherein product insurance risk information for the retail product includes at least one of: a vehicle identification number (VIN), vehicle purchase history for the automobile, a number of safety features in the automobile, or an indication of one or more antitheft devices in the automobile.

16. The system of claim 9, wherein the instructions cause the system to:
   receive and present, via the web browser from the online retailer server, an insurance application web page including one or more user controls for entering customer insurance risk information; and
   transmit, to the online retailer server, the customer insurance risk information from the customer via the insurance application web page.

* * * * *